United States Patent Office

2,847,442
Patented Aug. 12, 1958

2,847,442

NEW COMPOUNDS CONTAINING NITROGEN AND PHOSPHORUS

Richard Sallmann, Basel, Switzerland, assignor to Ciba Limited, Basel, Switzerland, a Swiss firm No Drawing. Application February 21, 1955
Serial No. 489,805

Claims priority, application Switzerland March 5, 1954

7 Claims. (Cl. 260—459)

It is known that compounds of the general formula

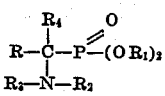

in which R, $R_2$, $R_3$ and $R_4$ represent hydrogen or an organic substituent, and $R_1$ represents an alkyl radical of low molecular weight, can be made by reacting a symmetrical dialkyl phosphite of the formula

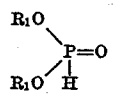

with (a) an aldehyde or ketone of the formula

and an amine of the formula

or (b) an α-alkylolamine of the formula

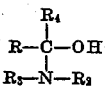

or (c) and alkylidene diamine of the formula

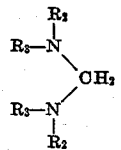

or (d) an N-substituted aminomethyl ether of the formula

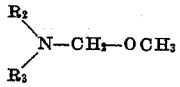

or (e) an aldimine or ketimine of the formula

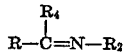

The present invention is based on the observation that valuable new derivatives are obtained by subjecting to the above reactions an asymmetrical ester of phosphorous acid, instead of symmetrical dialkyl phosphite. Accordingly, the present invention provides a process for the manufacture of compounds of the general formula

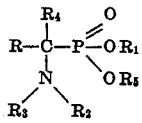

in which R, $R_2$, $R_3$ and $R_4$ each represent hydrogen or an organic substituent, $R_1$ represents the radical of an alcohol, and $R_5$ represents the radical of an alcohol different from that of $R_1$, wherein an asymmetrical ester of phosphorous acid of the general formula

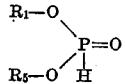

is reacted with (a) an aldehyde or ketone of the formula

and an amine of the formula

or (b) an α-alkylolamine of the formula

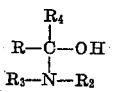

or (c) an alkylidene diamine of the formula

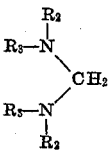

or (d) an N-disubstituted aminomethyl ether of the formula

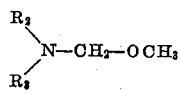

or (e) an aldimine or ketimine of the formula

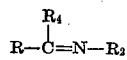

The starting materials of the general formula

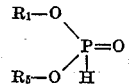

are asymmetrical esters of phosphorous acid. The radical $R_1$ may be of cycloaliphatic or more especially aliphatic nature. Advantageously it is the radical of an aliphatic alcohol of low molecular weight such as methyl alcohol, ethyl alcohol or propyl alcohol. The radical $R_5$ is different from the radical $R_1$. The radical $R_5$ may be of heterocyclic, araliphatic, cycloaliphatic or more especially aliphatic nature. Advantageously, it has a higher molecular weight than the radical $R_1$. However, each of these radicals may have substantially the same molecular weight and differ from one another in that the radical $R_1$ is aliphatic and the radical $R_5$, for example, araliphatic or heterocyclic. The aliphatic radicals, which the symbol $R_5$ may represent, may have straight or branched chains and be saturated or unsaturated. Furthermore they may be substituted or unsubstituted. There may be mentioned, for example, the following groups: ethyl, propyl, isopropyl, butyl, hexyl, 2-ethylbutyl, octyl, 2-butyloctyl, dodecyl, octadecenyl, octadecyl, allyl and 2-chloroethyl groups; and furthermore radicals containing thiocyano, cyano or ether groups or halogen atoms. Among the araliphatic radicals, which $R_5$ may represent, there may be mentioned the benzyl group, and among cycloaliphatic radicals the cyclohexyl group, and among heterocyclic radicals the tetrahydrofurfuryl radical. Especially valuable starting materials are dialkyl phosphites in which $R_1$ represents the radical of a lower aliphatic alcohol containing 1–4 carbon atoms, and $R_5$ represents the radical of a higher aliphatic alcohol containing about 8–30 carbon atoms. Among these phosphites there may be mentioned, for example, methyl dodecyl phosphite and ethyl octadecyl phosphite. The asymmetrical esters of phosphorous acid, which may be used as starting materials, are either known or can be made by methods in themselves known. An especially suitable method of preparing these compounds consists in the re-esterification of symmetrical phosphites.

The aldehydes or ketones of the general formula

used as starting materials may belong to various classes of compounds. There come into consideration aliphatic compounds, for example, formaldehyde, acetaldehyde, propionaldehyde, acetone, methyl ethyl ketone, and aromatic compounds such as benzaldehyde and substituted benzaldehydes, acetophenone, and heterocyclic compounds, for example, furfurol. Advantageously formaldehyde is used.

As amines of the general formula

there likewise come into consideration any primary or secondary amines of the aliphatic, aromatic, cycloaliphatic or heterocyclic series. There may be mentioned, for example, dimethylamine, diethylamine, di-isopropylamine, dibutylamine, di-cyclohexylamine, methylamine, ethylamine, butylamine, aniline, anisidine, N-ethylaniline, β-phenylethylamine, morpholine and piperidine. There are advantageously used lower aliphatic secondary amines.

The compounds to be used for carrying out the reactions under (b) to (e) above may be derived from the above mentioned ketones or aldehydes and amines and prepared from them by suitably selecting the components.

There are advantageously used the condensations specified under (a) and (b). The reactions may be carried out without solvents, but their use may be of advantage in many cases. Advantageously the condensation is carried out at a raised temperature, for example, 40–100° C.

Salts can be prepared from the condensation products by means of the usual acids, and it has been found that the condensation products obtained in accordance with the invention, insofar as they contain a tertiary amino group, can be converted into quaternary compounds by treatment with quaternating agents. As such agents there may be mentioned principally the usual alkylating and aralkylating agents. There may be mentioned, for example, methyl iodide, ethyl bromide, isopropyl chloride, secondary butyl bromide, dodecyl bromide, epichlorhydrin, dimethyl sulfate, benzyl halides and benzyl halides substituted in the nucleus, for example, by halogen atoms or alkyl or alkoxy groups, such as benzyl chloride and para-chloro-benzyl chloride, and also menaphthyl chloride, toluene sulfonic acid esters such as toluene sulfonic acid methyl ester, and also compounds which contain a group imparting solubility in water, such as halogen alkyl or aralkyl sulfonic acids, for example, bromethane sulfonic acid and benzyl chloride disulfonic acid. When salts of tertiary amines are used as starting materials, there may also be used for the quaternation alkylene oxides, such as ethylene oxide, propylene oxide or glycide. The quaternation is carried out under the conditions usual for quaternations, advantageously by heating the components at a raised temperature, for example, 50–200° C., if desired, under pressure. The use of an inert solvent such as an alcohol, for example, methanol or ethyl alcohol, or dioxane, monomethyl glycol, benzene, toluene, nitrobenzene or a mixture of such solvents may be of advantage. If desired, it may be of advantage to use an excess of the quaternating agent.

The new compounds, either in the form of their free bases or their salts and the quaternary ammonium salts derived therefrom, are formed in good yield and are stable both in solution and in solid form. The salts are generally soluble or easily dispersible in water. Compounds containing aliphatic radicals of high molecular weight also dissolve well in various organic solvents. The new products, their salts and quaternary ammonium salts can be used for a very wide variety of purposes in industry, for example, as intermediate products for making pest controlling agents or as pest controlling agents themselves. Suitably substituted compounds can also be used as assistants in the textile, leather or paper industries, for example, as washing, wetting or foaming agents. By virtue of their solubility in organic solvents they can also be used as additions to oils or lubricants, or as constituents of paints. Finally, suitably substituted compounds can also be used as emulsifying or dispersion agents.

The following examples illustrate the invention, the parts being by weight:

*Example 1*

3.6 parts of formaldehyde are introduced, while stirring, into a mixture of 27.8 parts of dodecyl ethyl phosphite and 15 parts of an alcoholic solution of 35 percent strength of dimethylamine. After heating the mixture for 2 hours at 50–60° C. the reaction is finished, and a test portion is clearly soluble in water after acidification. A small amount of warm water is added and the upper layer is removed. The oil which remains behind is taken up in ether, washed three times with water, and dried and the ether is distilled off. 27 parts of a residue are obtained. The product distils at 150–162° C. under 0.2 mm. pressure. The base is a colorless oil, which dissolves slightly in cold water to give a clear solution after acidification. Aqueous solutions of the hydrochloric acid salt foam strongly.

*Example 2*

3.3 parts of the base obtained as described in Example 1 are dissolved in ether and mixed with an ethereal solution of 1.26 parts of freshly distilled dimethyl sulfate. After a short time the solution solidifies. The ether is distilled off, and a colorless soft mass remains behind, which dissolves clearly in water while foaming strongly. The product corresponds to the general formula

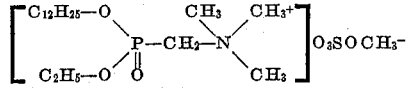

Instead of dimethylsulfate, benzyl chloride may be used for the quaternation.

Both quaternary salts possess a strong fungicidal action.

Alternaria fungi do not grow on a nutrient agar containing 0.1% of one of the above mentioned quaternary salts, while they do grow on a nutrient agar not containing such a salt.

What is claimed is:

1. A member selected from the group consisting of compounds of the formula

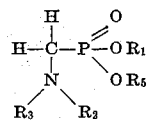

water-soluble acid addition salts thereof and quaternary ammonium salts thereof, wherein $R_2$ and $R_3$ each represents a lower alkyl radical, $R_1$ represents an alkyl radical containing 1–4 carbon atoms, and $R_5$ represents an alkyl radical containing 8–30 carbon atoms.

2. A compound of the general formula

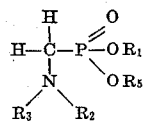

wherein $R_2$ and $R_3$ each represents a lower alkyl radical, $R_1$ represents an alkyl radical containing 1–4 carbon atoms and $R_5$ represents an alkyl radical containing 8–30 carbon atoms.

3. A water soluble acid addition salt of a compound of the general formula

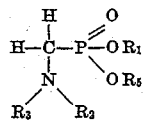

wherein $R_2$ and $R_3$ each represents a lower alkyl radical, $R_1$ represents an alkyl radical containing 1–4 carbon atoms and $R_5$ represents an alkyl radical containing 8–30 carbon atoms.

4. A quaternary ammonium salt derived from a compound of the general formula

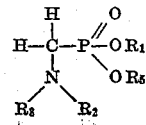

wherein $R_2$ and $R_3$ each represents a lower alkyl radical, $R_1$ represents an alkyl radical containing 1–4 carbon atoms and $R_5$ represents an alkyl radical containing 8–30 carbon atoms.

5. The compound of the formula

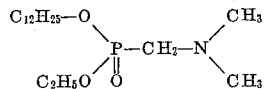

6. The hydrochloride of the compound of the formula

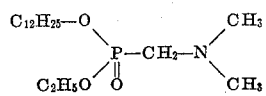

7. The quaternary salt of the formula

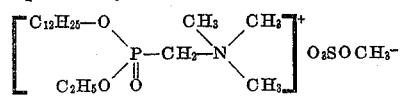

References Cited in the file of this patent

UNITED STATES PATENTS 2,570,503    Tawney           Oct. 9, 1951
2,635,112    Fields            Apr. 14, 1953

OTHER REFERENCES

Schwartz Perry: Surface Active Agents, 1949, pp. 153, 515.